(12) United States Patent
Goda

(10) Patent No.: US 8,488,154 B2
(45) Date of Patent: Jul. 16, 2013

(54) IMAGE FORMING APPARATUS AND IMAGE FORMING METHOD

(75) Inventor: Junichi Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 12/491,017

(22) Filed: Jun. 24, 2009

(65) Prior Publication Data

US 2009/0323111 A1 Dec. 31, 2009

(30) Foreign Application Priority Data

Jun. 30, 2008 (JP) ................................. 2008-170875

(51) Int. Cl.
*G06F 3/12* (2006.01)

(52) U.S. Cl.
USPC ............................ 358/1.15; 358/1.13; 358/1.9

(58) Field of Classification Search
USPC ........................ 358/1.15, 1.14, 1.9
See application file for complete search history.

(56) References Cited

U.S. PATENT DOCUMENTS

| 5,161,226 A | * | 11/1992 | Wainer | 710/264 |
| 6,490,055 B1 | * | 12/2002 | Shimizu | 358/1.9 |
| 2008/0137135 A1 | * | 6/2008 | Takeishi | 358/1.15 |

FOREIGN PATENT DOCUMENTS

| JP | 07-137353 A | | 5/1995 |
| JP | 08-139953 A | | 5/1996 |
| JP | 2004-066532 A | | 3/2004 |
| JP | 2004-088596 A | | 3/2004 |
| JP | 2004088596 A | * | 3/2004 |
| JP | 2006-173843 A | | 6/2006 |

* cited by examiner

*Primary Examiner* — Marivelisse Santiago Cordero
*Assistant Examiner* — Moustapha Diaby
(74) *Attorney, Agent, or Firm* — Canon USA Inc. IP Division

(57) ABSTRACT

An image processing controller suspends an operation of hardware when receiving instructions of an interrupt of an event that should be executed with higher priority than rendering, such as a copy job, during execution of rendering by the hardware. Then, an information processing controller executes the rendering, which was being executed by the hardware, by software. Accordingly, even if an interrupt to suspend the operation of the hardware occurs during rendering by the hardware, the rendering can be completed as quickly as possible without waiting for restart of the operation of the hardware.

8 Claims, 21 Drawing Sheets

| PAGE | DL DATA GENERATION FLAG | DL DATA STORAGE SITE | RENDERING FLAG |
|---|---|---|---|
| 1 | NOT YET | – | NOT YET |
| 2 | NOT YET | – | NOT YET |
| 3 | NOT YET | – | NOT YET |
| 4 | NOT YET | – | NOT YET |

| PAGE | DL DATA GENERATION FLAG | DL DATA STORAGE SITE | RENDERING FLAG |
|---|---|---|---|
| 1 | GENERATED | AREA A | RENDERED(HARD) |
| 2 | GENERATED | AREA B | NOT YET |
| 3 | GENERATED | AREA C | NOT YET |
| 4 | NOT YET | – | NOT YET |

| PAGE | DL DATA GENERATION FLAG | DL DATA STORAGE SITE | RENDERING FLAG |
|---|---|---|---|
| 1 | GENERATED | AREA A | RENDERED(HARD) |
| 2 | GENERATED | AREA B | RENDERED(SOFT) |
| 3 | GENERATED | AREA C | RENDERED(SOFT) |
| 4 | GENERATED | AREA D | RENDERED(HARD) |

FIG. 6

| TYPE OF INTERRUPT | PRIORITY |
|---|---|
| COPY JOB | 1 |
| SEND JOB | 2 |
| PDL JOB | 3 |
| FAX JOB | 4 |
| PAPER IS PUT ON FEEDER | 5 |
| . . . | . |
| . . . | . |
| . . . | . |

| PAGE | DL DATA GENERATION FLAG | DL DATA STORAGE SITE | RENDERING FLAG |
|---|---|---|---|
| 1 | NOT YET | - | NOT YET |

| 1500 | 1510 |
|---|---|
| HARD RENDERER FLAG | SOFT RENDERING END FLAG |
| OFF | OFF |

| PAGE | DL DATA GENERATION FLAG | DL DATA STORAGE SITE | RENDERING FLAG |
|---|---|---|---|
| 1 | GENERATED | ADDRESS A | NOT YET |

| 1500 | 1510 |
|---|---|
| HARD RENDERER FLAG | SOFT RENDERING END FLAG |
| ON | OFF |

| PAGE | DL DATA GENERATION FLAG | DL DATA STORAGE SITE | RENDERING FLAG |
|---|---|---|---|
| 1 | GENERATED | ADDRESS A | RENDERED(HARD) |

| 1500 | 1510 |
|---|---|
| HARD RENDERER FLAG | SOFT RENDERING END FLAG |
| OFF | OFF |

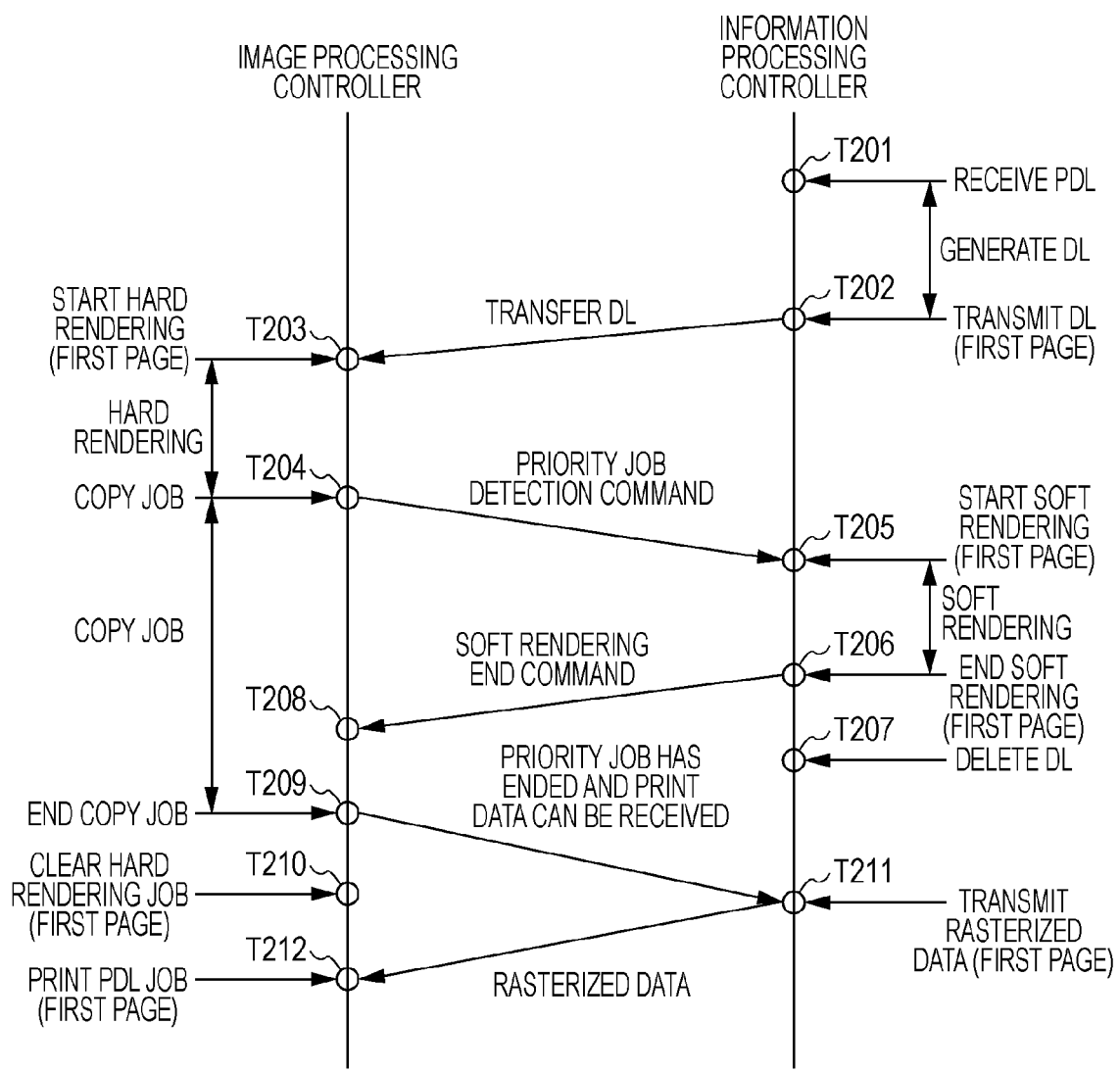

| PAGE | DL DATA GENERATION FLAG | DL DATA STORAGE SITE | RENDERING FLAG |
|---|---|---|---|
| 1 | NOT YET | – | NOT YET |

1500　　　　　　　　　　　　1510

| HARD RENDERER FLAG | SOFT RENDERING END FLAG |
|---|---|
| OFF | OFF |

| PAGE | DL DATA GENERATION FLAG | DL DATA STORAGE SITE | RENDERING FLAG |
|---|---|---|---|
| 1 | GENERATED | ADDRESS A | NOT YET |

1500　　　　　　　　　　　　1510

| HARD RENDERER FLAG | SOFT RENDERING END FLAG |
|---|---|
| ON | OFF |

| PAGE | DL DATA GENERATION FLAG | DL DATA STORAGE SITE | RENDERING FLAG |
|---|---|---|---|
| 1 | GENERATED | ADDRESS A | RENDERED(SOFT) |

1500　　　　　　　　　　　　1510

| HARD RENDERER FLAG | SOFT RENDERING END FLAG |
|---|---|
| ON | OFF |

| PAGE | DL DATA GENERATION FLAG | DL DATA STORAGE SITE | RENDERING FLAG |
|---|---|---|---|
| 1 | GENERATED | ADDRESS A | RENDERED(SOFT) |

1500　　　　　　　　　　　　1510

| HARD RENDERER FLAG | SOFT RENDERING END FLAG |
|---|---|
| ON | ON |

| PAGE | DL DATA GENERATION FLAG | DL DATA STORAGE SITE | RENDERING FLAG |
|---|---|---|---|
| 1 | GENERATED | ADDRESS A | RENDERED(SOFT) |

1500　　　　　　　　　　　　1510

| HARD RENDERER FLAG | SOFT RENDERING END FLAG |
|---|---|
| OFF | OFF |

| PAGE | DL DATA GENERATION FLAG | DL DATA STORAGE SITE | RENDERING FLAG |
|---|---|---|---|
| 1 | NOT YET | – | NOT YET |

| 1500 | 1510 |
|---|---|
| HARD RENDERER FLAG | SOFT RENDERING END FLAG |
| OFF | OFF |

| PAGE | DL DATA GENERATION FLAG | DL DATA STORAGE SITE | RENDERING FLAG |
|---|---|---|---|
| 1 | GENERATED | ADDRESS A | NOT YET |

| 1500 | 1510 |
|---|---|
| HARD RENDERER FLAG | SOFT RENDERING END FLAG |
| ON | OFF |

| PAGE | DL DATA GENERATION FLAG | DL DATA STORAGE SITE | RENDERING FLAG |
|---|---|---|---|
| 1 | GENERATED | ADDRESS A | RENDERED(HARD) |

| 1500 | 1510 |
|---|---|
| HARD RENDERER FLAG | SOFT RENDERING END FLAG |
| OFF | OFF |

| PAGE | DL DATA GENERATION FLAG | DL DATA STORAGE SITE | RENDERING FLAG |
|---|---|---|---|
| 1 | NOT YET | – | NOT YET |
| 2 | NOT YET | – | NOT YET |

| 1500 | 1510 |
|---|---|
| HARD RENDERER FLAG | SOFT RENDERING END FLAG |
| OFF | OFF |

| PAGE | DL DATA GENERATION FLAG | DL DATA STORAGE SITE | RENDERING FLAG |
|---|---|---|---|
| 1 | GENERATED | ADDRESS A | NOT YET |
| 2 | NOT YET | – | NOT YET |

| 1500 | 1510 |
|---|---|
| HARD RENDERER FLAG | SOFT RENDERING END FLAG |
| ON | OFF |

| PAGE | DL DATA GENERATION FLAG | DL DATA STORAGE SITE | RENDERING FLAG |
|---|---|---|---|
| 1 | GENERATED | ADDRESS A | NOT YET |
| 2 | GENERATED | ADDRESS B | NOT YET |

| 1500 | 1510 |
|---|---|
| HARD RENDERER FLAG | SOFT RENDERING END FLAG |
| ON | OFF |

| PAGE | DL DATA GENERATION FLAG | DL DATA STORAGE SITE | RENDERING FLAG |
|---|---|---|---|
| 1 | GENERATED | ADDRESS A | RENDERED(SOFT) |
| 2 | GENERATED | ADDRESS B | NOT YET |

| 1500 | 1510 |
|---|---|
| HARD RENDERER FLAG | SOFT RENDERING END FLAG |
| ON | ON |

| PAGE | DL DATA GENERATION FLAG | DL DATA STORAGE SITE | RENDERING FLAG |
|---|---|---|---|
| 1 | GENERATED | ADDRESS A | RENDERED(SOFT) |
| 2 | GENERATED | ADDRESS B | RENDERED(SOFT) |

| 1500 | 1510 |
|---|---|
| HARD RENDERER FLAG | SOFT RENDERING END FLAG |
| ON | ON |

| PAGE | DL DATA GENERATION FLAG | DL DATA STORAGE SITE | RENDERING FLAG |
|---|---|---|---|
| 1 | GENERATED | ADDRESS A | RENDERED(SOFT) |
| 2 | GENERATED | ADDRESS B | RENDERED(SOFT) |

| 1500 | 1510 |
|---|---|
| HARD RENDERER FLAG | SOFT RENDERING END FLAG |
| OFF | OFF |

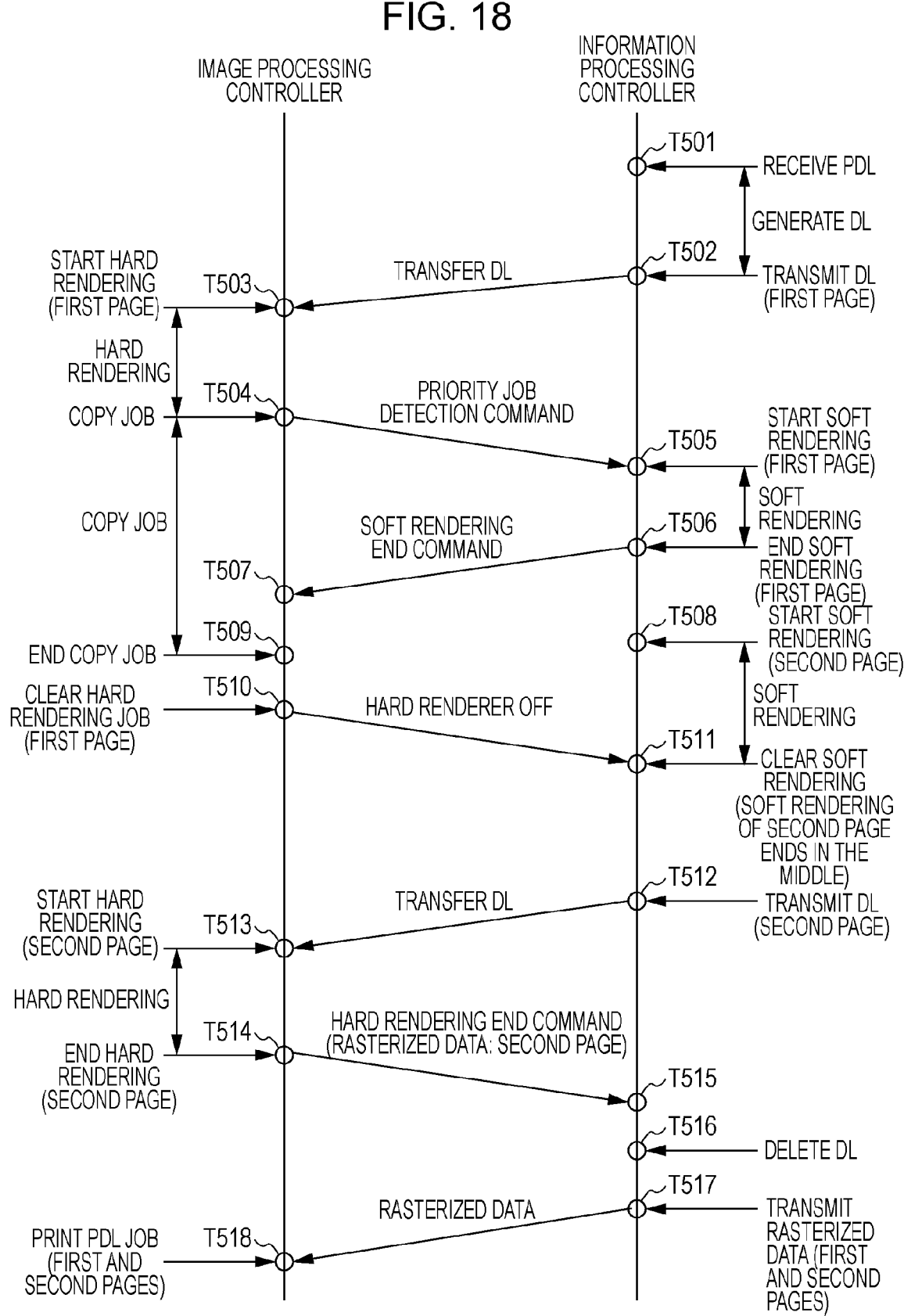

| PAGE | DL DATA GENERATION FLAG | DL DATA STORAGE SITE | RENDERING FLAG |
|---|---|---|---|
| 1 | NOT YET | – | NOT YET |
| 2 | NOT YET | – | NOT YET |

| 1500 | 1510 |
|---|---|
| HARD RENDERER FLAG | SOFT RENDERING END FLAG |
| OFF | OFF |

| PAGE | DL DATA GENERATION FLAG | DL DATA STORAGE SITE | RENDERING FLAG |
|---|---|---|---|
| 1 | GENERATED | ADDRESS A | NOT YET |
| 2 | NOT YET | – | NOT YET |

| 1500 | 1510 |
|---|---|
| HARD RENDERER FLAG | SOFT RENDERING END FLAG |
| ON | OFF |

| PAGE | DL DATA GENERATION FLAG | DL DATA STORAGE SITE | RENDERING FLAG |
|---|---|---|---|
| 1 | GENERATED | ADDRESS A | NOT YET |
| 2 | GENERATED | ADDRESS B | NOT YET |

| 1500 | 1510 |
|---|---|
| HARD RENDERER FLAG | SOFT RENDERING END FLAG |
| ON | OFF |

| PAGE | DL DATA GENERATION FLAG | DL DATA STORAGE SITE | RENDERING FLAG |
|---|---|---|---|
| 1 | GENERATED | ADDRESS A | RENDERED(SOFT) |
| 2 | GENERATED | ADDRESS B | NOT RENDERED |

| 1500 | 1510 |
|---|---|
| HARD RENDERER FLAG | SOFT RENDERING END FLAG |
| ON | ON |

| PAGE | DL DATA GENERATION FLAG | DL DATA STORAGE SITE | RENDERING FLAG |
|---|---|---|---|
| 1 | GENERATED | ADDRESS A | RENDERED(SOFT) |
| 2 | GENERATED | ADDRESS B | NOT RENDERED |

| 1500 | 1510 |
|---|---|
| HARD RENDERER FLAG | SOFT RENDERING END FLAG |
| OFF | OFF |

| PAGE | DL DATA GENERATION FLAG | DL DATA STORAGE SITE | RENDERING FLAG |
|---|---|---|---|
| 1 | GENERATED | ADDRESS A | RENDERED(SOFT) |
| 2 | GENERATED | ADDRESS B | RENDERED(HARD) |

| 1500 | 1510 |
|---|---|
| HARD RENDERER FLAG | SOFT RENDERING END FLAG |
| OFF | OFF |

IMAGE FORMING APPARATUS AND IMAGE FORMING METHOD

BACKGROUND OF THE INVENTION

1. Field of the Invention

The present invention relates to an image forming apparatus and an image forming method, particularly to an image forming apparatus and an image forming method used for rendering.

2. Description of the Related Art

In recent years, a shift from monochrome print to color print has been progressing in image processing apparatuses (image forming apparatuses) represented by a digital multi-function peripheral (MFP). The shift to color print causes an increase in the amount of information processed in the image processing apparatuses. Also, demand for higher printing speed has been increasing, and a faster process in the image processing apparatuses has been demanded. Under such circumstances, the following method for increasing the speed of a process in a print job input from a host computer to an image processing apparatus is generally known.

In a typical system to generate raster image data by interpreting input page description language (PDL) data, an intermediate language in the form of a display list (DL) is generated by interpreting the PDL data. The DL as intermediate language is then converted to a raster image. The process of converting the intermediate language to a raster image is known as rendering. In the series of processes, a very heavy load is imposed on the process in rendering, but the rendering can be realized by hardware relatively easily. Therefore, rendering-dedicated hardware (hard renderer) is mounted on the system to increase the speed of rendering in typical cases.

However, in the rendering-dedicated hardware, the size of various tables used in works during rendering is limited due to a hardware property. For this reason, the rendering-dedicated hardware is not capable of rasterizing complicated data at a time. In view of this, there is a technique of simultaneously performing rendering by hardware and rendering by software on PDL data that is not rasterized at a time and using a result of the earliest completed rendering (see Japanese Patent Laid-Open No. 2004-66532).

In an image processing apparatus, such as a digital MFP, a copy job or the like may be required to be performed with higher priority than a print job. Thus, if a copy job is input to the image processing apparatus while a print job is being processed (in particular while a hardware renderer is rendering PDL data input thereto), the copy job should be preferentially executed by suspending the hardware renderer. In the related art, however, such a method causes suspension of rendering of PDL data and delay in completing rendering.

SUMMARY OF THE INVENTION

The present invention has been made in view of the above-described issues and is directed to completing rendering as quickly as possible even if an interrupt process to suspend an operation of hardware occurs during rendering by hardware.

According to an embodiment of the present invention, an image forming apparatus includes a hardware rendering unit configured to execute rendering; a detecting unit configured to detect an interrupt by an event having higher priority than the rendering; a suspending unit configured to suspend the rendering being executed by the hardware rendering unit if the interrupt is detected while the hardware rendering unit is executing the rendering; and a software rendering unit configured to execute rendering if the interrupt is detected by the detecting unit while the hardware rendering unit is executing the rendering.

According to the above-described configuration, if an interrupt is detected during rendering by hardware, the rendering by the hardware is suspended and rendering by software is executed. Accordingly, even if an interrupt to suspend the operation of the hardware occurs during rendering by the hardware, the rendering can be completed as quickly as possible. Thus, degradation of performance of a job including rendering can be prevented as much as possible.

Further features of the present invention will become apparent from the following description of exemplary embodiments with reference to the attached drawings.

BRIEF DESCRIPTION OF THE DRAWINGS

FIGS. 5A to 5C specifically illustrate examples of content of a PDL table according to the embodiment of the present invention.

FIG. 6 illustrates an example of content of a priority interrupt detection table according to the embodiment of the present invention.

FIGS. 11A to 11C illustrate examples of content of PDL table, hard renderer flag, and soft rendering end flag in the first operation example according to the embodiment of the present invention.

FIG. 12 is a timing chart illustrating a second operation example according to the embodiment of the present invention.

FIGS. 13A to 13E illustrate examples of content of PDL table, hard renderer flag, and soft rendering end flag in the second operation example according to the embodiment of the present invention.

FIGS. 15A to 15C illustrate examples of content of PDL table, hard renderer flag, and soft rendering end flag in the third operation example according to the embodiment of the present invention.

FIGS. 17A to 17F illustrate examples of content of PDL table, hard renderer flag, and soft rendering end flag in the fourth operation example according to the embodiment of the present invention.

FIG. 18 is a timing chart illustrating a fifth operation example according to the embodiment of the present invention.

FIGS. 19A to 19F illustrate examples of content of PDL table, hard renderer flag, and soft rendering end flag in the fifth operation example according to the embodiment of the present invention.

DESCRIPTION OF THE EMBODIMENTS

Hereinafter, embodiments of the present invention are described with reference to the attached drawings.

<Configuration of Image Forming System>

Figure 1:
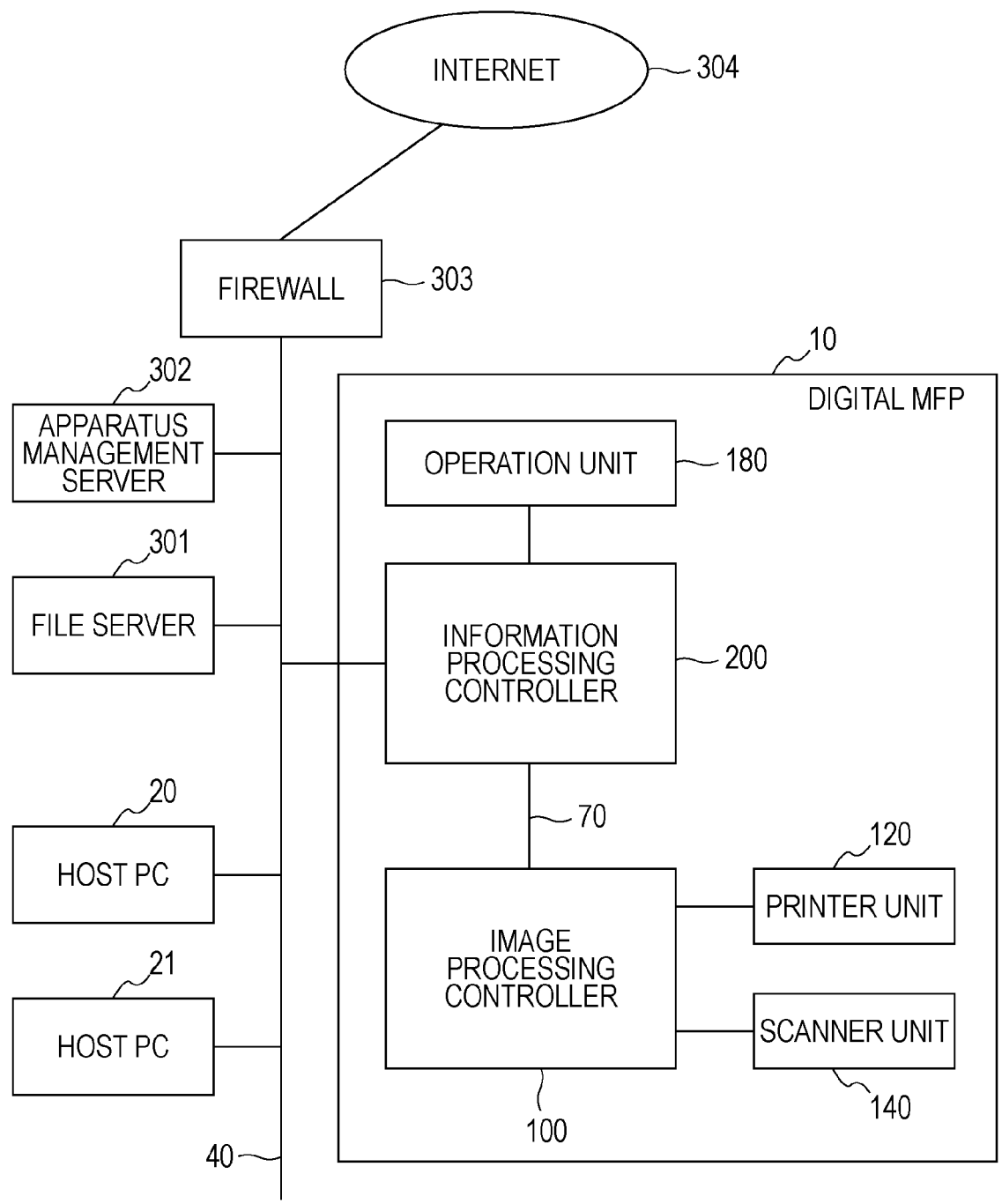
FIG. 1 illustrates an example of a configuration of an image forming system according to an embodiment of the present invention.

FIG. 1 illustrates an example of a configuration of an image forming system. Referring to FIG. 1, a firewall 303 connects to the Internet 304 and apparatuses connected to a LAN (Local Area Network) 40. The firewall 303 performs security management and so on. An apparatus management server 302 manages a digital MFP (multifunction peripheral) 10, host PCs (Personal Computers) 20 and 21, and a file server 301 connected to the LAN 40. The file server 301 manages data shared by users of the respective apparatuses connected to the LAN 40.

The digital MFP 10 is an example of an image processing apparatus (image forming apparatus) and mainly has an image input/output function. In the digital MFP 10, an operation unit 180 is used by a user to perform various operations. In this embodiment, the operation unit 180 includes a display unit having a touch panel. A scanner unit 140 is an image scanner to read images in accordance with instructions from the operation unit 180 or the host PC 20 or 21. A printer unit 120 is a printer to print data transmitted from the host PC 20 or 21 or the file server 301 on sheets.

An image processing controller 100 mainly performs image processing. An information processing controller 200 mainly performs information processing. The image processing controller 100 and the information processing controller 200 are mutually connected via a local communication line 70. The image processing controller 100 and the information processing controller 200 control input/output of image data from/to the scanner unit 140 and the printer unit 120 on the basis of instructions from the operation unit 180 or the host PC 20 or 21. For example, image data scanned by the scanner 140 is accumulated in a memory inside the image processing controller 100 or the information processing controller 200, is output to the host PC 20 or 21, or is printed by the printer unit 120.

<Appearance of Digital MFP 10>

Figure 2:
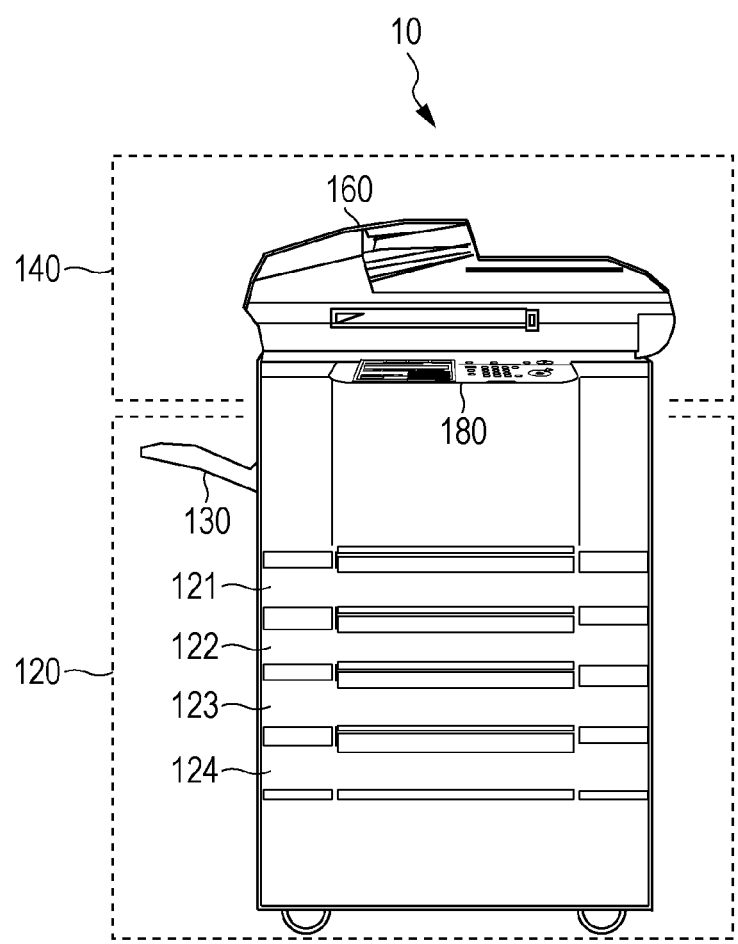
FIG. 2 illustrates an example of an appearance configuration of a digital MFP according the embodiment of the present invention.

FIG. 2 illustrates an example of an appearance configuration of the digital MFP 10. In the scanner unit 140, which is an image input device, a CCD (charge-coupled device) line sensor reads a document image irradiated with light of a lamp and converts it to electric signals, thereby generating image data to be processed. A user sets document sheets on a document feeder 160 and provides read start instructions via the operation unit 180. Accordingly, the document feeder 160 feeds the document sheets one after another. Then, the document sheets are fed to the scanner unit 140, and a document image reading operation is performed in the above-described manner.

The printer unit 120, which is an image output device, converts image data to an image on a sheet. The printer unit 120 may be based on an electrophotography method using a photosensitive drum or a photosensitive belt, or may be based on a method of ejecting ink from a small nozzle array and directly printing an image on a sheet. That is, the printing method used in the printer unit 120 is not particularly limited. A printing operation starts in accordance with instructions from the image processing controller 100 in the digital MFP 10. The printer unit 120 includes a plurality of paper feeders so that different sheet sizes or different sheet orientations can be selected, and also includes paper cassettes 121, 122, 123, and 124 corresponding to the paper feeders.

<Configuration of Digital MFP: Image Processing Controller>

Figure 3:
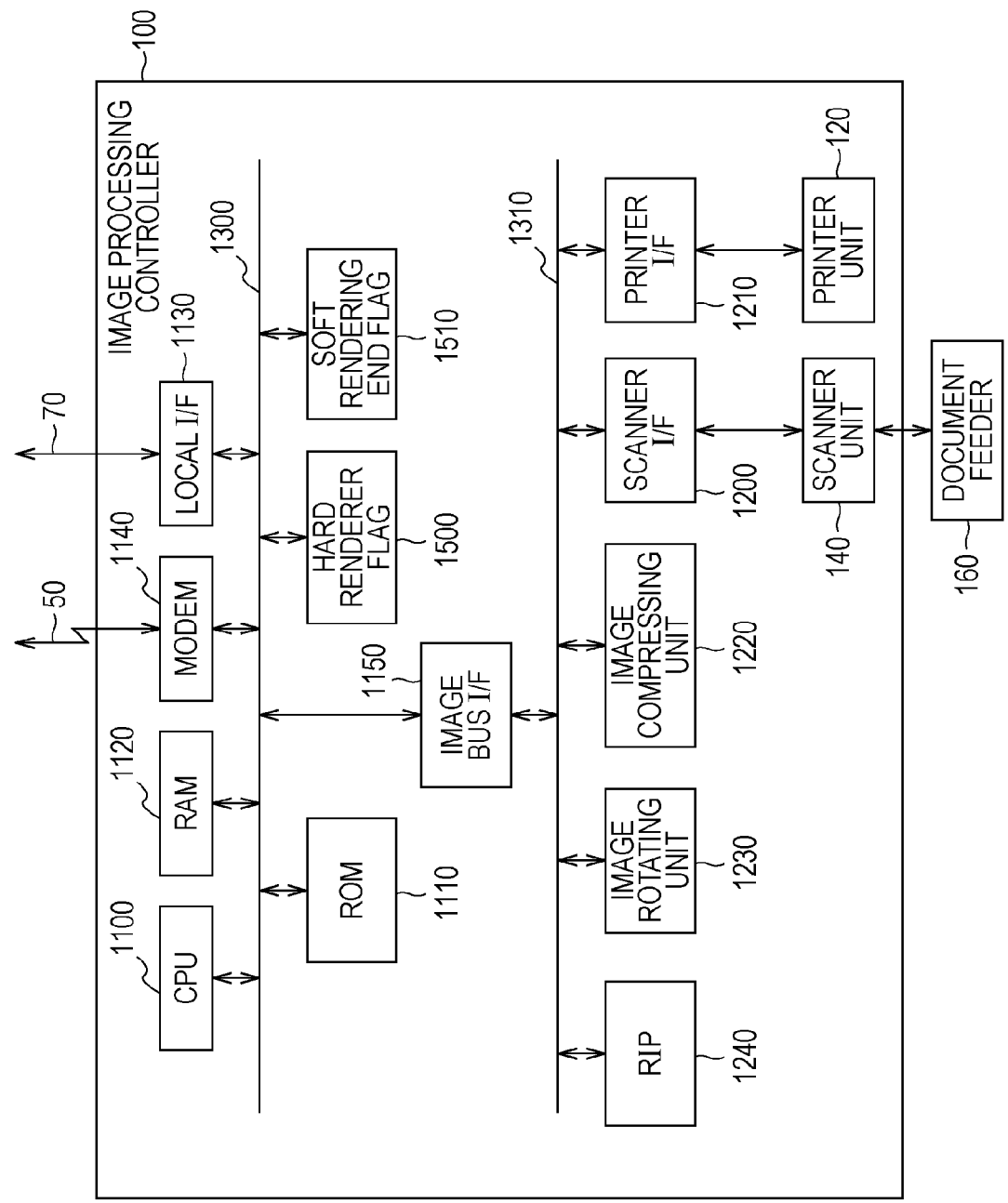
FIG. 3 illustrates an example of a configuration of an image processing controller in the digital MFP according to the embodiment of the present invention.

FIG. 3 illustrates an example of a configuration of the image processing controller 100 in the digital MFP 10.

The image processing controller 100 performs image processing by connecting to the scanner unit 140 as an image input device or the printer unit 120 as an image output device. Also, the image processing controller 100 inputs/outputs images by connecting to a public line (WAN: Wide Area Network) 50 or the like.

A CPU (Central Processing Unit) 1100 is a controller to control the entire image processing controller 100. A ROM (Read Only Memory) 1110 is a boot ROM and stores a boot program of the image processing controller 100. A RAM (Random Access Memory) 1120 is a system work memory for the CPU 1100 to operate, and also functions as an image memory to temporarily store image data.

A local I/F (Interface) 1130 is a high-speed communication I/F allowing the image processing controller 100 to communicate with the information processing controller 200. Thus, the information processing controller 200 includes a local I/F 2130 having an equivalent function (see FIG. 4). The local I/F 1130 and the local I/F 2130 are mutually connected via a local communication line 70. The local I/F 1130 may be a communication I/F, such as PCI (Peripheral Component Interconnect) or PCI_Express. Various data including images and commands are transferred between the image processing controller 100 and the information processing controller 200. A modem 1140 connects to the public line 50 and inputs/outputs data. Also, in this embodiment, devices including a hard renderer flag 1500 and a soft rendering end flag 1510 connect to a system bus 1300. The substance of the hard renderer flag 1500 and the soft rendering end flag 1510 is a register, for example. Alternatively, the RAM 1120 may have the functions corresponding to the hard renderer flag 1500 and the soft rendering end flag 1510. The hard renderer flag 1500 and the soft rendering end flag 1510 are characteristic, and thus the details thereof are described below.

An image bus I/F 1150 is a bus bridge that connects the system bus 1300 to an image bus 1310 to transfer image data at high speed and that converts data structure. A scanner I/F 1200 connects to the scanner unit 140 and communicate with a CPU of the scanner unit 140. Also, the scanner I/F 1200 performs synchronous/asynchronous conversion of image data. Also, the scanner I/F 1200 can accept an interrupt when a sheet is placed on the document feeder 160 connected to the scanner unit 140.

A printer I/F 1210 connects to the printer unit 120 and communicates with a CPU of the printer unit 120. Also, the printer I/F 1210 performs synchronous/asynchronous conversion of image data. An image compressing unit 1220 performs a compressing/decompressing process based on JPEG (Joint Photographic Experts Group) on multivalued image data, and performs a compressing/decompressing process based on JBIG (Joint Bi-level Image Experts Group), MMR (Modified Modified Read), or MH (Modified Huffman) on binary image data. An image rotating unit 1230 rotates image data. A RIP (Raster Image Processor) 1240 converts an intermediate language (in this embodiment, DL (display list)), that is generated by the information processing controller 200 and that can be processed by hardware, to rasterized data (raster data). Here, the rasterized data is bitmap image data, for example. In the following description, conversion of DL data to rasterized data performed by the RIP 1240 is called "hard rendering" as necessary. The above-described devices connect to the image bus 1310.

<Configuration of Digital MFP: Information Processing Controller>

Figure 4:
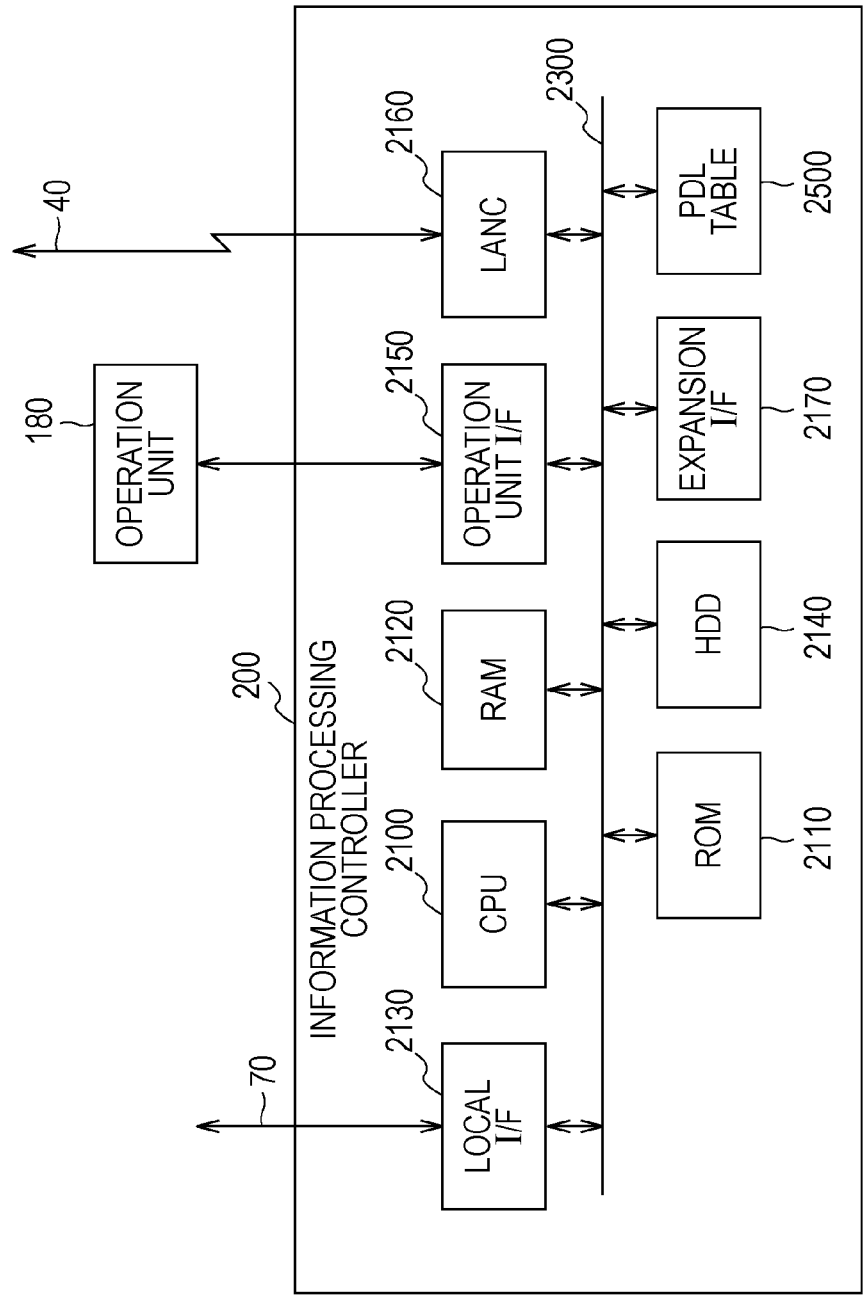
FIG. 4 illustrates an example of a configuration of an information processing controller in the digital MFP according to the embodiment of the present invention.

FIG. 4 illustrates an example of a configuration of the information processing controller 200 in the digital MFP 10. The information processing controller 200 is a controller mainly performing information processing in the digital MFP 10. The information processing controller 200 connects to the LAN 40 and the operation unit 180, thereby responding to input/output of image information or device information or a command from a user. Also, the information processing controller 200 can easily expand a software process by upgrading software and an application program by using the LAN 40 or a download I/F (not illustrated).

A CPU 2100 is a controller to control the entire information processing controller 200. A ROM 2110 is a boot ROM and stores a boot program of the information processing controller 200. A RAM 2120 is a system work memory for the CPU 2100 to operate, and also functions as an image memory to temporarily store image data.

The local I/F 2130 is a high-speed I/F allowing the information processing controller 200 to communicate with the image processing controller 100, as described above. A HDD 2140 is a hard disk drive that stores system software, image data, software counter values, and so on. Here, the system software is software that executes various functions, such as a copy function and a FAX function. In this embodiment, this system software is called "bootable" as necessary.

The "bootable" is used herein to refer to a program to realize functions such as copy, FAX, send, scan, display etc, in response to e.g. instructions input by a user via the operation unit (UI), and operates by being developed in the RAM 2120 or the RAM 1120 of the image processing controller 100. The information processing controller 200 transmits only a necessary "bootable" in the digital MFP 10 to the image processing controller 100. The image processing controller 100 develops the received "bootable" in the RAM 1120 so as to enable the operation of "bootable".

An operation unit I/F 2150 is an interface unit for the operation unit 180 serving as a UI, and outputs image data to be displayed in the operation unit 180 to the operation unit 180. Also, the operation unit 180 transfers information input to the operation unit 180 by a user of the digital MFP 10 to the CPU 1100.

A LANC 2160 connects to the LAN 40 and inputs/outputs image data or information about apparatus control. Also, the LANC 2160 receives output image data according to an input operation by the operation unit 180 from the host PC 20 or 21 or an output image data managing apparatus (not illustrated) connected to the LAN 40. An expansion I/F 2170 is an interface for an expansion function, such as an audio function. A PDL table 2500 is a table showing a processing status of "a PDL job including PDL data" received from the LAN 40, a storage site of DL data, and so on. The PDL table 2500 is characteristic, and thus the details thereof are described below.

In this embodiment, the information processing controller 200 has a characteristic function of converting PDL data received from the LAN 40 to DL data by software. Also, the information processing controller 200 can convert DL data generated for hard rendering to rasterized data (e.g., bitmap image data) by software. Hereinafter, conversion of DL data to rasterized data by software is called "soft rendering" as necessary. The function of the soft rendering is the same as that of the hard rendering executed by the RIP 1240 of the image processing controller 100.

<Hard Renderer Flag 1500>

The hard renderer flag 1500 illustrated in FIG. 3 is ON when the RIP 1240 is performing hard rendering and is OFF in the other time. For example, the hard renderer flag 1500 is ON when the RIP 1240 of the image processing controller 100 is performing hard rendering on DL data. If the hard rendering is not completed when the image processing controller 100 receives an interrupt job of high priority such as a copy job, the hard rendering by the RIP 1240 is suspended. Thus, in this embodiment, the hard renderer flag 1500 is kept in an ON state in such a case.

<Soft Rendering End Flag 1510>

The soft rendering end flag 1510 illustrated in FIG. 3 indicates whether soft rendering has ended. When soft rendering ends, the soft rendering end flag 1510 is set to ON by the information processing controller 200. Then, the soft rendering end flag 1510 is set to OFF by the image processing controller 100.

<PDL Table>

FIGS. 5A to 5C illustrate specific examples of the content of the PDL table 2500. As described above, the PDL table 2500 is a table showing a processing status of PDL data received by the information processing controller 200 and a storage site of DL data. The PDL table 2500 is generated in the RAM 2120 or the HDD 2140 when the information processing controller 200 receives PDL data. In the examples illustrated in FIGS. 5A to 5C, the PDL data received by the information processing controller 200 includes four pages.

In FIGS. 5A to 5C, a column of "page" indicates the page of PDL data received by the information processing controller 200. A column of "DL data generation flag" indicates whether DL data has been generated from the PDL data received by the information processing controller 200. A column of "DL data storage site" indicates a storage site of the DL data generated by the information processing controller 200. The DL data is stored mainly in the HDD 2140, but may be stored in the RAM 2120. A column of "rendering flag" indicates whether rasterized data has been generated from the DL data by rendering. The column of "rendering flag" includes information indicating the type of rendering performed: hard rendering or soft rendering.

FIG. 5A illustrates an example of the PDL table in an initial state. That is, the PDL table 2500 illustrated in FIG. 5A is in the state immediately after being generated on reception of the PDL data. In the PDL data 2500 illustrated in FIG. 5A, DL data has not been generated in all the pages. Thus, the DL data storage site has not been decided. Also, in the PDL table 2500 illustrated in FIG. 5A, rendering has not been performed and thus the rendering flag shows "not yet".

FIG. 5B illustrates an example of the PDL table in the state where DL data has been generated in page 1 to page 3 but not in page 4. Since DL data has been generated in page 1 to page 3, storage sites of the generated DL data are shown in "DL data storage site" in the PDL table 2500 illustrated in FIG. 5B. Also, the PDL table illustrated in FIG. 5B shows that a rendering process by hard rendering has ended only in page 1.

FIG. 5C illustrates an example of the PDL table in the state where the rendering process has ended in all the pages. That is, the PDL table 2500 illustrated in FIG. 5C shows the state where the process of "job including PDL data" received by the information processing controller 200 has ended. In this way, the rendering flag is set to "rendered" in all the pages, and then all the corresponding DL data is deleted from the information processing controller 200. The PDL table 2500 is deleted after all the corresponding PDL data has been rendered and printing has been completed.

<Priority Interrupt Detection Table>

FIG. 6 illustrates an example of the content of a priority interrupt detection table. The priority interrupt detection table is used by the image processing controller 100 or the information processing controller 200 to decide an interrupt process that should be preferentially processed by the image processing controller 100.

The priority interrupt detection table illustrated in FIG. 6 may be stored in the nonvolatile ROM 1110 of the image processing controller 100 or in the HDD 2140 of the information processing controller 200. The content of the priority interrupt detection table may be uniquely decided or may arbitrarily set by a user via the operation unit 180 or the LAN 40. In the example illustrated in FIG. 6, the highest priority is placed on a copy job, and the degree of priority decreases in the following order: a send job, a PDL job, a FAX job, and so on. The interrupts to which priority is given in the priority interrupt detection table are not limited to jobs, and may include a state where paper is put on a feeder, for example.

<Control Flowchart by Image Processing Controller>

Figure 7:
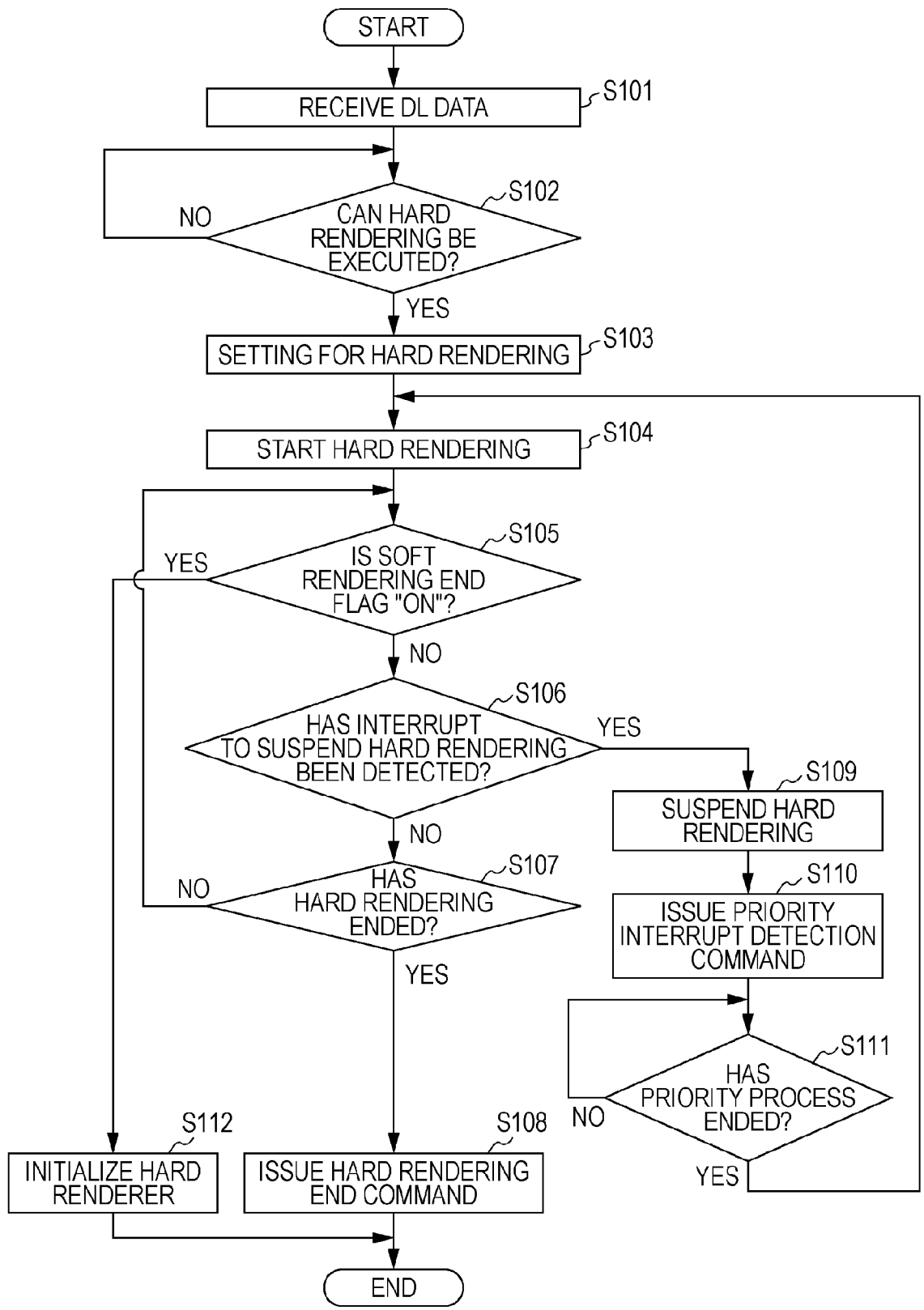
FIG. 7 is a flowchart illustrating an example of a process in the image processing controller according to the embodiment of the present invention.

FIG. 7 is a flowchart illustrating an example of a process performed in the image processing controller 100. In step S101, the image processing controller 100 receives DL data from the information processing controller 200.

In step S102, the image processing controller 100 determines whether hard rendering can be executed. As a result of the determination, if there is a job that should be preferentially processed, such as a copy job, the image processing controller 100 waits for timing to start hard rendering.

When the timing to start hard rendering comes, the process proceeds to step S103. In step S103, the image processing controller 100 makes settings necessary for hard rendering, e.g., a register setting of the RIP 1240 and acquisition of a memory. Then, the image processing controller 100 sets the hard renderer flag 1500 to ON.

In step S104, the image processing controller 100 starts hard rendering by using the RIP 1240. As described above, in this embodiment, an example of a hard rendering unit is used to perform step S104.

In step S105, the image processing controller 100 determines whether the soft rendering end flag 1510 is set to ON. As a result of the determination, if the soft rendering end flag 1510 is set to ON, the process proceeds to step S112 described below.

On the other hand, if the soft rendering end flag 1510 is not set to ON, the process proceeds to step S106. In step S106, the image processing controller 100 determines whether an interrupt to suspend execution of hard rendering has been detected on the basis of the content of the priority interrupt detection table. As a result of the determination, if an interrupt to suspend execution of hard rendering has been detected, the process proceeds to step S109 described below. As described above, in this embodiment, an example of a detecting unit is used to perform step S106.

On the other hand, if an interrupt to suspend execution of hard rendering has not been detected, the process proceeds to step S107. In step S107, the image processing controller 100 determines whether the hard rendering started in step S104 had ended. As a result of the determination, if the hard rendering has not ended, the process returns to step S105 described above.

On the other hand, if the hard rendering has ended, the process proceeds to step S108. In step S108, the image processing controller 100 issues a hard rendering end command to the information processing controller 200. Here, since the hard rendering has ended, the image processing controller 100 sets the hard renderer flag 1500 to OFF. A result of the hard rendering is developed in the RAM 1120. By a task of managing a print job, not illustrated, the image processing controller 100 communicates with the information processing controller 200 and processes the result of the hard rendering on the basis of the result of the communication. For example, the image processing controller 100 outputs the result of the hard rendering to the printer unit 120 or transfers it to the information processing controller 200 as necessary. Then, the process of the flowchart illustrated in FIG. 7 ends.

In the above-described step S106, if it is determined that an interrupt to suspend execution of hard rendering has been detected, the process proceeds to step S109. For example, in the case where the priority interrupt detection table illustrated in FIG. 6 is used, the process proceeds to step S109 if a copy job or a send job is input to the image processing controller 100 during execution of the hard rendering.

In step S109, the image processing controller 100 suspends the execution of the hard rendering. As described above, in this embodiment, an example of a suspending unit is realized by performing step S109.

In step S110, the image processing controller 100 issues a priority interrupt detection command to the information processing controller 200. The priority interrupt detection command is a command to start soft rendering in the information processing controller 200.

In step S111, the image processing controller 100 waits until the process that should be executed with higher priority than the hard rendering ends. After the process ends, the process returns to step S104, and the hard rendering restarts.

As described above, in this embodiment, an example of a restarting unit is used to return the process from step S111 to step S104 and to restart the hard rendering. Also, an example of an executing unit is implemented when the image processing controller 100 executes a process that is required to be executed with higher priority than the hard rendering.

If it is determined in step S105 that the soft rendering end flag 1510 is set to ON, the process proceeds to step S112. In step S112, the image processing controller 100 initializes or clears the hard renderer and sets the hard renderer flag 1500 to OFF. Here, initialization of the hard renderer includes clearing a register module of the RIP 1240 and clearing rendering data (DL data and rasterized data that is being developed) in a memory. Then, the process of the flowchart illustrated in FIG. 7 ends. As described above, in this embodiment, an example of a deleting unit is used to perform step S112.

<Control Flowchart to Generate DL Data by Information Processing Controller>

Figure 8:
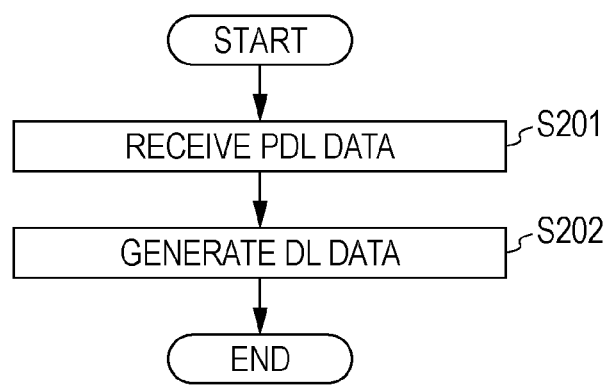
FIG. 8 is a flowchart illustrating an example of a process in the information processing controller to generate DL data according to the embodiment of the present invention.

FIG. 8 is a flowchart illustrating an example of a process of generating DL data performed by the information processing controller 200. In step S201, the information processing controller 200 receives PDL data from an external apparatus via the LAN 40. After receiving the PDL data, the information processing controller 200 generates the PDL table 2500 for the PDL data.

In step S202, the information processing controller 200 converts the PDL data received in step S201 to DL data. Then, the information processing controller 200 stores the generated DL data in the RAM 2120 or the HDD 2140. In typical cases, the DL data is stored in the HDD 2140 if the number of pages is large. However, if there is a sufficient memory area to store the generated DL data, the DL data may be stored in the memory of the RAM 2120 having the memory area.

After generating the DL data, the information processing controller 200 sets the DL data generation flag of the page indicated by the DL data to "generated" with reference to the PDL table 2500 and stores data indicating the area where the DL data has been stored in the DL data storage site. Step S202 is repeatedly performed until all the PDL data received in step S201 has been processed.

In this way even in the case where soft rendering, as a substitute for hard rendering, ends before hard rendering restarts if there is PDL data from which DL data has not been generated, DL data can be sequentially generated from the PDL data. Also in the case where soft rendering, as a substitute for hard rendering, ends before hard rendering restarts, if new PDL data is received in step S201, DL data can be generated from the PDL data.

<Control Flowchart After DL Data has been Generated by Information Processing Controller>

Figure 9:
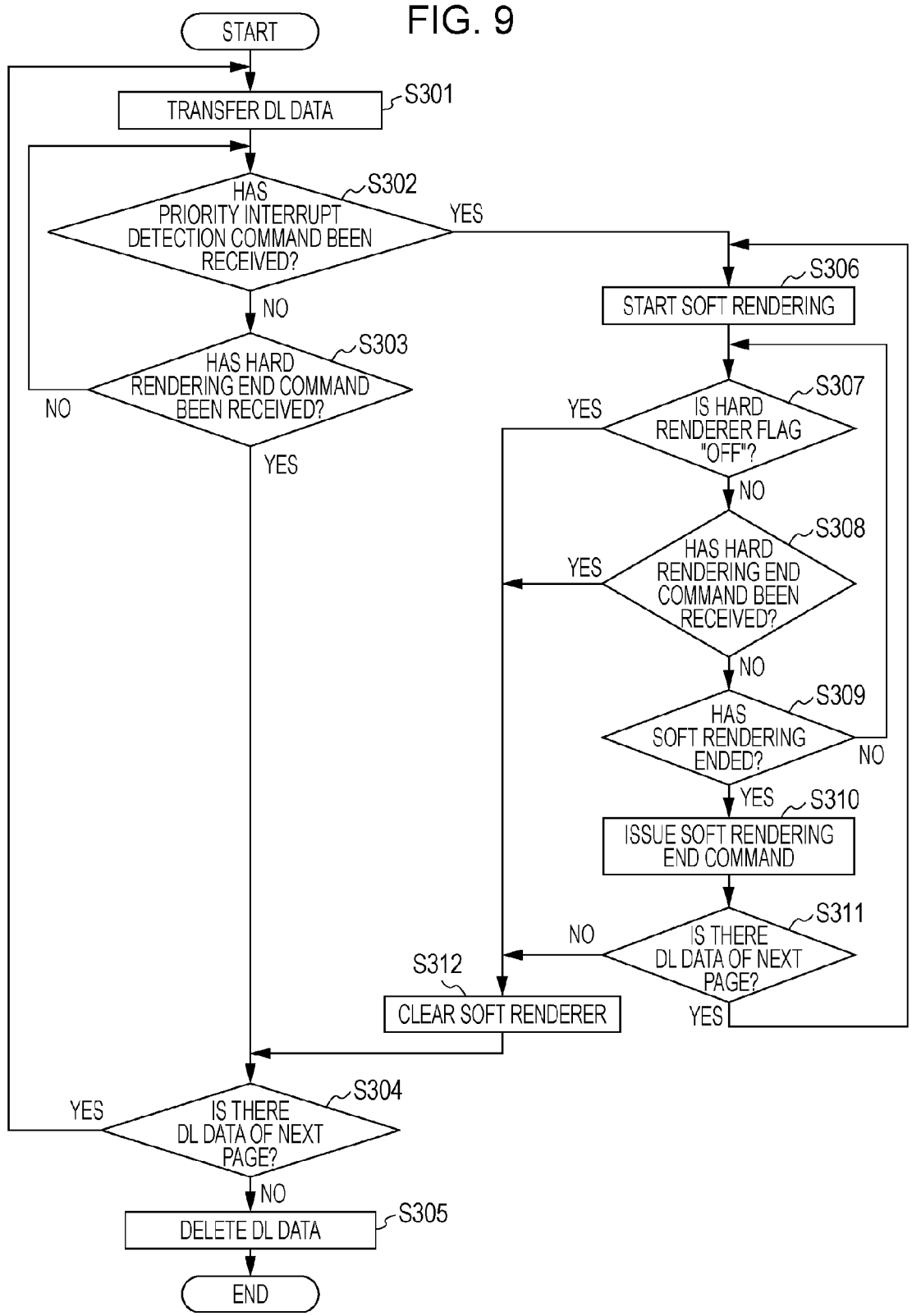
FIG. 9 is a flowchart illustrating an example of a process in the information processing controller after DL data has been generated according to the embodiment of the present invention.

FIG. 9 is a flowchart illustrating an example of a process performed in the information processing controller 200 after the DL data has been generated.

In step S301, the information processing controller 200 transfers the DL data generated in step S202 in FIG. 8 to the image processing controller 100. At this time, the information processing controller 200 transfers the DL data in which the DL data generation flag is set to "generated" and the rendering flag is set to "not yet" in the PDL table 2500 to the image processing controller 100.

Here, the information processing controller 200 may transfer DL data every time DL data of one page is generated in step S202 in FIG. 8, or may transfer DL data every time DL data of all pages based on PDL data is generated. Alternatively, the information processing controller 200 may transfer DL data at other timing.

Then, in step S302, the information processing controller 200 determines whether a priority interrupt detection command has been received from the image processing controller 100 (see step S110 in FIG. 7). As a result of the determination, if a priority interrupt detection command has been received, the process proceeds to step S306 described below.

On the other hand, if a priority interrupt detection command has not been received, the process proceeds to step S303. In step S303, the information processing controller 200 determines whether a hard rendering end command has been received from the image processing controller 100 (see step S108 in FIG. 7).

As a result of the determination, if a hard rendering end command has not been received from the image processing controller 100, the process returns to step S302. On the other hand, if a hard rendering end command has been received from the image processing controller 100, the process proceeds to step S304. In step S304, it is determined whether there is DL data of a next page. Here, whether there is DL data of a next page is determined by determining whether there is a page in which the DL data generation flag is set to "generated" and the rendering flag is set to "not yet" in the PDL table 2500.

As a result of the determination, if there is a page in which the DL data generation flag is set to "generated" and the rendering flag is set to "not yet", that is, if there is DL data of a next page, the process returns to step S301. On the other hand, if there is not a page in which the DL data generation flag is set to "generated" and the rendering flag is set to "not yet", that is, if there is not DL data of a next page, the process proceeds to step S305. In step S305, the information processing controller 200 deletes all the data related to the PDL data on which rendering has been performed (PDL table 2500 and DL data). Then, the process of the flowchart in FIG. 9 ends.

If it is determined in step S302 that a priority interrupt detection command has been received, the process proceeds to step S306. In step S306, the information processing controller 200 starts soft rendering on the DL data transferred in step S301. The DL data on which soft rendering is to be performed is the DL data of the earliest page for which the DL data generation flag is set to "generated" and the rendering flag is set to "not yet" in the PDL table 2500. Then, the information processing controller 200 issues a soft rendering start notification or command to the image processing controller 100. The image processing controller 100 that has received the soft rendering start command sets the soft rendering end flag 1510 to OFF if it is set to ON. The timing to set the soft rendering end flag 1510 to OFF is not limited to this timing. For example, the soft rendering end flag 1510 can be set to OFF in step S312 in FIG. 9. As described above, in this embodiment, an example of soft rendering unit is used to perform step S306.

As described above, even in the case where soft rendering as a substitute for hard rendering ends before hard rendering restarts, if there is PDL data from which DL data has not been generated, DL data is sequentially generated from the PDL data. Therefore, in such a case, the information processing controller 200 can sequentially perform soft rendering on the DL data on which soft rendering was not performed in step S306.

In step S307, the information processing controller 200 determines whether the hard rendering flag 1500 is OFF. As a result of the determination, if the hard rendering flag 1500 is OFF, the process proceeds to step S312 described below.

On the other hand, if the hard rendering flag 1500 is not OFF (is ON), the process proceeds to step S308. In step S308, the information processing controller 200 determines whether a hard rendering end command has been received from the image processing controller 100 (see step S108 in FIG. 7). As a result of the determination, if a hard rendering end command has been received from the image processing controller 100, the process proceeds to step S312 described below.

On the other hand, if a hard rendering end command has not been received from the image processing controller 100, the process proceeds to step S309. In step S309, the information processing controller 200 determines whether the soft rendering started in step S306 has ended. As a result of the determination, if the soft rendering has not ended, the process returns to step S307.

On the other hand, if the soft rendering has ended, the process proceeds to step S310. In step S310, the information processing controller 200 issues a soft rendering end command to the image processing controller 100. The image processing controller 100 that has received the soft rendering end command sets the soft rendering end flag 1510 to ON.

The image data rasterized by the soft rendering is compressed in JBIG or the like as necessary and is stored in the RAM 2120 or the HDD 2140 until the image data can be printed in the image processing controller 100. The information processing controller 200 communicates with the image processing controller 100 and transfers the stored data to the image processing controller 100 at the timing when printing can be performed on the basis of a result of the communication in the task of managing a print job not illustrated.

In step S311, the information processing controller 200 determines whether there is DL data of a next page. The determination can be made as in step S304, for example. As a result of the determination, if there is DL data of a next page, the process returns to step S306.

On the other hand, if there is not DL data of a next page, the process proceeds to step S312. As described above, the process proceeds to step S312 also in the cases where the hard renderer flag is set to OFF (step S307) and where the hard rendering end command has been received (step S308). In step S312, the information processing controller 200 clears the soft renderer. Then, the process proceeds to step S304. Here, clearing the soft renderer includes a process of releasing a work area of the RAM 2120 acquired for the soft rendering and clearing the setting necessary for the soft rendering. Step S312 corresponds to discontinuing the soft rendering that is currently processed.

The case where the process proceeds to step S312 as a result of the determination in step S307 that the hard rendering flag is set to OFF is the case where it is determined in step S311 that there is DL data of a next page. That is, the process proceeds from step S307 to step S312 while soft rendering is being performed on the DL data of the next page and thereafter in the state where hard rendering can be performed. As described above, in this embodiment, an example of a deleting unit is realized by performing step S312.

First Operation Example

Figure 10:
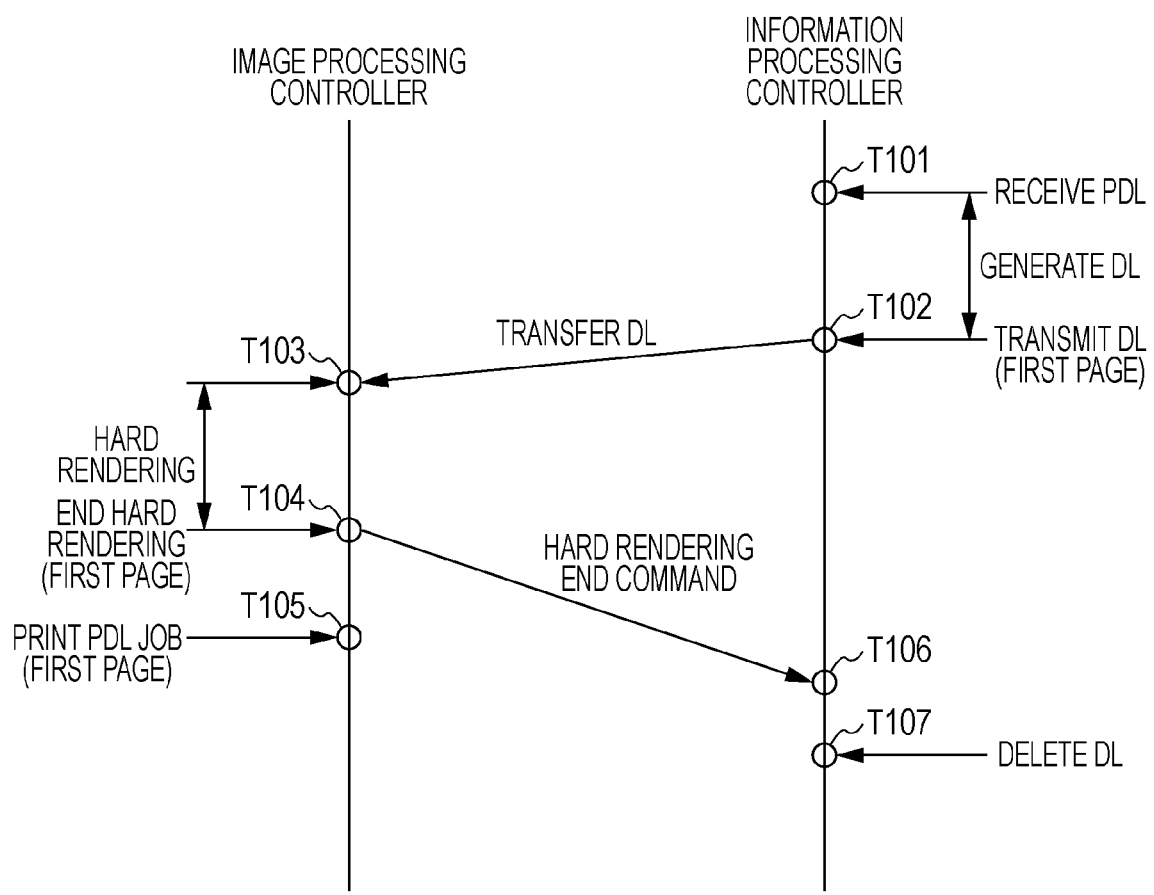
FIG. 10 is a timing chart illustrating a first operation example according to the embodiment of the present invention.

The Case where the Number of Pages of PDL Data is 1 and only Hard Rendering is Executed FIG. 10 is a timing chart illustrating a first operation example of this embodiment. In the first operation example, the information processing controller 200 receives PDL data of a page. Then, only hard rendering is executed in the image processing controller 100. In FIG. 10, the time elapses in the direction from the top to the bottom of the figure. FIGS. 11A to 11C illustrate examples of the content of the PDL table 2500, the hard renderer flag 1500, and the soft rendering end flag 1510 in the first operation example.

Referring to FIG. 10, the information processing controller 200 receives PDL data at timing T101. At this time, the PDL table 2500 illustrated in FIG. 11A is generated. Then, at timing T102, the information processing controller 200 generates DL data and transfers the generated DL data to the image processing controller 100.

At timing T103, the image processing controller 100 receives the DL data and starts hard rendering. At this time, the PDL table 2500, the hard renderer flag 1500, and the soft rendering end flag 1510 are in the state illustrated in FIG. 11B. Then, at timing T104, the image processing controller 100 detects end of the hard rendering, and issues a hard rendering end notification or command to the information processing controller 200.

At timing T105, the image processing controller 100 prints raster data generated by the hard rendering. At timing T106, the information processing controller 200 receives the hard rendering end notification or command. At this time, the PDL table 2500, the hard renderer flag 1500, and the soft rendering end flag 1510 are in the state illustrated in FIG. 11C. In the first operation example, the number of pages of the PDL data is 1 and there is not DL data of a next page. Thus, at timing T107, the information processing controller 200 deletes the generated DL data.

Second Operation Example

The First Case where the Number of Pages of PDL Data is 1 and Priority Interrupt Occurs During Hard Rendering FIG. 12 is a timing chart illustrating a second operation example of this embodiment. In the second operation example, the information processing controller 200 receives PDL data of a page. Then, a priority interrupt occurs while the image processing controller 100 is executing hard rendering, and the information processing controller 200 executes soft rendering. The soft rendering ends earlier than the hard rendering. In FIG. 12, too, the time elapses in the direction from the top to the bottom of the figure. FIGS. 13A to 13E illustrate examples of the content of the PDL table 2500, the hard renderer flag 1500, and the soft rendering end flag 1510 in the second operation example.

Referring to FIG. 12, the information processing controller 200 receives PDL data at timing T201. At this time, the PDL table 2500 illustrated in FIG. 13A is generated. At timing T202, the information processing controller 200 generates DL data and transfers the generated DL data to the image processing controller 100. At timing T203, the image processing controller 100 receives the DL data and starts hard rendering. At this time, the PDL table 2500, the hard renderer flag 1500, and the soft rendering end flag 1510 are in the state illustrated in FIG. 13B.

At timing T204, the image processing controller 100 receives an interrupt of a copy job as a priority interrupt. Then, the image processing controller 100 suspends the hard rendering and issues a priority job detection command to the information processing controller 200. At timing T205, having received the priority job detection command, the information processing controller 200 starts soft rendering. At timing T206, the information processing controller 200 detects the end of the soft rendering and issues a soft rendering end notification or command to the image processing controller 100.

In the second operation example, the number of pages of the PDL data is 1 and consequently there is not DL data of a next page. Thus, at timing T207, the information processing controller 200 deletes the generated DL data. At timing T208, the image processing controller 100 receives the soft rendering end command and sets the soft rendering end flag to ON. At this time, the state of the PDL table 2500, the hard renderer flag 1500, and the soft rendering end flag 1510 changes from the state illustrated in FIG. 13C to the state illustrated in FIG. 13D. At timing T209, the image processing controller 100 detects end of the copy job and notifies the information processing controller 200 of the detection.

Since the soft rendering end flag is set to ON, the image processing controller 100 initializes the hard renderer at timing T210. In this embodiment, an example of the deleting unit is realized by executing the process at timing T210.

At timing T211, the information processing controller 200 transfers the rasterized data generated by the soft rendering to the image processing controller 100. Specifically, the information processing controller 200 communicates with the image processing controller 100 and determines the timing to perform printing on the basis of a result of the communication, and then transfers the rasterized data generated by the soft rendering to the image processing controller 100 at the timing.

Accordingly, at timing T212, the image processing controller 100 receives the rasterized data from the information processing controller 200 and executes printing of the PDL data on the basis of the rasterized data generated by the hard rendering and the received rasterized data. At this time, the PDL table 2500, the hard renderer flag 1500, and the soft rendering end flag 1510 are in the state illustrated in FIG. 13E. In this embodiment, an example of a forming unit is realized by executing the process at timing T212.

Third Operation Example

Figure 14:
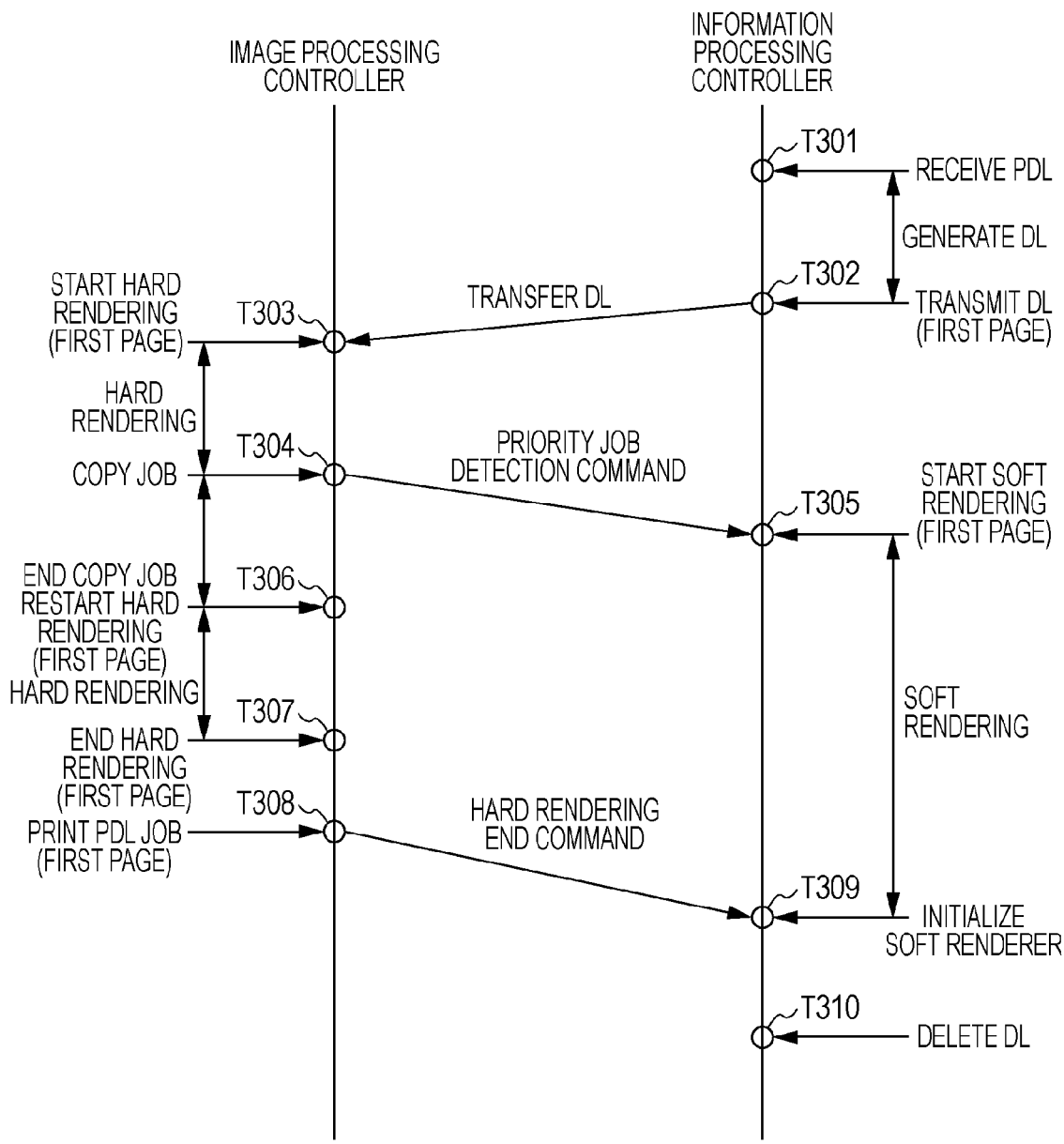
FIG. 14 is a timing chart illustrating a third operation example according to the embodiment of the present invention.

The Second Case where the Number of Pages of PDL Data is 1 and Priority Interrupt Occurs During Hard Rendering FIG. 14 is a timing chart illustrating a third operation example of this embodiment. In the third operation example, the information processing controller 200 receives PDL data of a page. Then, a priority interrupt occurs while the image processing controller 100 is executing hard rendering, and the information processing controller 200 executes soft rendering. The hard rendering ends earlier than the soft rendering. In FIG. 14, too, the time elapses in the direction from the top to the bottom of the figure. FIGS. 15A to 15C illustrate examples of the content of the PDL table 2500, the hard renderer flag 1500, and the soft rendering end flag 1510 in the third operation example.

Referring to FIG. 14, the information processing controller 200 receives PDL data at timing T301. At this time, the PDL table 2500 illustrated in FIG. 15A is generated. At timing T302, the information processing controller 200 generates DL data and transfers the generated DL data to the image processing controller 100. At timing T303, the image processing controller 100 receives the DL data and starts hard rendering. At this time, the PDL table 2500, the hard renderer flag 1500, and the soft rendering end flag 1510 are in the state illustrated in FIG. 15B.

At timing T304, the image processing controller 100 receives an interrupt of a copy job as a priority interrupt. Then, the image processing controller 100 suspends the hard rendering and issues a priority job detection command to the information processing controller 200. On receiving the priority job detection command at timing T305, the information processing controller 200 starts soft rendering. At timing T306, the image processing controller 100 detects end of the copy job and restarts the hard rendering. At timing T307, the image processing controller 100 detects end of the hard rendering and issues a hard rendering end command to the information processing controller 200.

At timing T308, the image processing controller 100 executes printing of the PDL data on the basis of the rasterized data generated by the hard rendering. In this embodiment, an example of the forming unit is realized by executing the process at timing T308.

At timing T309, the information processing controller 200 receives the hard rendering end command and initializes or clears the soft renderer. At this time, the PDL table 2500, the hard renderer flag 1500, and the soft rendering end flag 1510 are in the state illustrated in FIG. 15C. In this embodiment, an example of the deleting unit is realized by executing the process at timing T309. In the third operation example, the number of pages of the PDL data is 1 and there is not DL data of a next page. Thus, at timing T310, the information processing controller 200 deletes the generated DL data.

Fourth Operation Example

Figure 16:
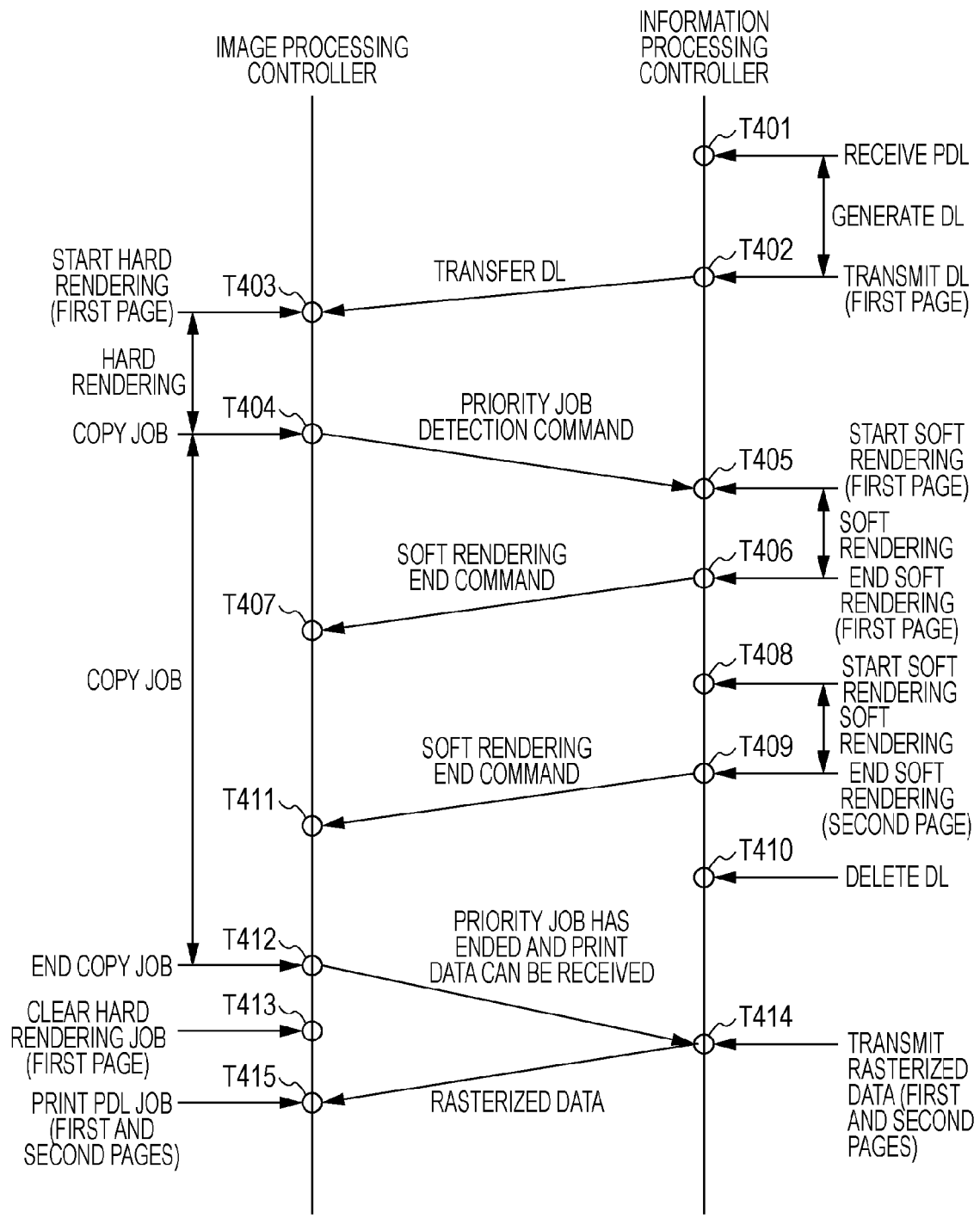
FIG. 16 is a timing chart illustrating a fourth operation example according to the embodiment of the present invention.

The Case where the Number of Pages of PDL Data is 2, Priority Interrupt Occurs during Hard Rendering, and Soft Rendering is Executed on all the Two Pages FIG. 16 is a timing chart illustrating a fourth operation example of this embodiment. In the fourth operation example, the information processing controller 200 receives PDL data of two pages. Then, a priority interrupt occurs while the image processing controller 100 is executing hard rendering, and the information processing controller 200 executes soft rendering on all the two pages. In FIG. 16, too, the time elapses in the direction from the top to the bottom of the figure. FIGS. 17A to 17F illustrate examples of the content of the PDL table 2500, the hard renderer flag 1500, and the soft rendering end flag 1510 in the fourth operation example.

Referring to FIG. 16, the information processing controller 200 receives PDL data at timing T401. At this time, the PDL table 2500 illustrated in FIG. 17A is generated. At timing T402, the information processing controller 200 generates DL data and transfers the generated DL data to the image processing controller 100. At timing T403, the image processing controller 100 receives the DL data and starts hard rendering. At this time, the PDL table 2500, the hard renderer flag 1500, and the soft rendering end flag 1510 are in the state illustrated in FIG. 17B.

At timing T404, the image processing controller 100 receives an interrupt of a copy job as a priority interrupt. Then, the image processing controller 100 suspends the hard rendering and issues a priority job detection command to the information processing controller 200. At timing T405, the information processing controller 200 starts soft rendering. At this time, the PDL table 2500, the hard renderer flag 1500, and the soft rendering end flag 1510 are in the state illustrated in FIG. 17C.

At timing T406, the information processing controller 200 detects end of the soft rendering and issues a soft rendering end command to the image processing controller 100. At timing T407, the image processing controller 100 receives the soft rendering end command and sets the soft rendering end flag 1510 to ON. At this time, the PDL table 2500, the hard renderer flag 1500, and the soft rendering end flag 1510 are in the state illustrated in FIG. 17D. In the fourth operation example, there is DL data of a next page (second page), and thus the information processing controller 200 starts soft rendering on the second page at timing T408.

At timing T409, the information processing controller 200 detects end of the soft rendering and issues a soft rendering end command to the image processing controller 100. As there is no DL data of a next page, the information processing controller 200 deletes the generated DL data at timing T410. At timing T411, the soft rendering end flag remains in an ON state. At this time, the PDL table 2500, the hard renderer flag 1500, and the soft rendering end flag 1510 are in the state illustrated in FIG. 17E.

At timing T412, the image processing controller 100 detects end of the copy job and notifies the information processing controller 200 of the detection. Also, since the soft rendering end flag is set to ON, the image processing controller 100 initializes or clears the hard renderer at timing T413. Then, the image processing controller 100 sets the hard renderer flag 1500 to OFF. In this embodiment, an example of the deleting unit is realized by executing the process at timing T413.

At timing T414, the information processing controller 200 transfers the rasterized data generated by the soft rendering to the image processing controller 100. Specifically, the information processing controller 200 communicates with the image processing controller 100 and determines the timing to perform printing on the basis of a result of the communication, and then transfers the rasterized data generated by the soft rendering to the image processing controller 100 at the timing. In the fourth operation example, there are two pages of rasterized data generated by the soft rendering, and thus the rasterized data of the two pages is transferred.

At timing T415, the image processing controller 100 receives the rasterized data from the information processing controller 200 and executes printing of the PDL data on the basis of the received rasterized data. At this time, the PDL table 2500, the hard renderer flag 1500, and the soft rendering end flag 1510 are in the state illustrated in FIG. 17F. In this embodiment, an example of the forming unit is realized by executing the process at timing T415.

Fifth Operation Example

The Case where the Number of Pages of PDL Data is 2, Priority Interrupt Occurs during Hard Rendering, and Hard Rendering becomes Available during Soft Rendering of Second Page FIG. 18 is a timing chart illustrating a fifth operation example of this embodiment. In the fifth operation example, the information processing controller 200 receives PDL data of two pages. Then, a priority interrupt occurs while the image processing controller 100 is executing hard rendering on the first page, and the information processing controller 200 executes soft rendering on the first page. The information processing controller 200 executes soft rendering also on the second page, but in the fifth operation example, hard rendering becomes available during soft rendering of the second page. In the time axis in FIG. 18, too, the time elapses in the direction from the top to the bottom of the figure. In FIG. 18, the rendered PDL data of all the pages is stored in the HDD 2140 of the information processing controller 200, and rasterized data is transferred to the image processing controller 100 after rendering of all the pages has been completed.

Referring to FIG. 18, the information processing controller 200 receives PDL data at timing T501. At this time, the PDL table 2500 illustrated in FIG. 19A is generated. At timing T502, the information processing controller 200 generates DL data and transfers the DL data of the first page to the image processing controller 100. At timing T503, the image processing controller 100 receives the DL data of the first page and starts hard rendering. At this time, the PDL table 2500, the hard renderer flag 1500, and the soft rendering end flag 1510 are in the state illustrated in FIG. 19B.

At timing T504, the image processing controller 100 receives an interrupt of a copy job as a priority interrupt. Then, the image processing controller 100 suspends the hard rendering and issues a priority job detection command to the information processing controller 200. At timing T505, the information processing controller 200 starts soft rendering. At this time, the PDL table 2500, the hard renderer flag 1500, and the soft rendering end flag 1510 are in the state illustrated in FIG. 19C. As is clear from the PDL table 2500 illustrated in FIG. 19C, conversion from PDL data to DL data has ended in the second page.

At timing T506, the information processing controller 200 issues a soft rendering end command to the image processing controller 100. At timing T507, the image processing controller 100 sets the soft rendering end flag 1510 to ON. At this time, the PDL table 2500, the hard renderer flag 1500, and the soft rendering end flag 1510 are in the state illustrated in FIG. 19D. In the fifth operation example, there is DL data of the next page (second page). Thus, at timing T508, the information processing controller 200 starts soft rendering of the DL data of the second page.

At timing T509, the image processing controller 100 ends the copy job. Then, since the soft rendering end flag is set to ON, the image processing controller 100 initializes the hard renderer at timing T510. Then, the image processing controller 100 sets the hard rendering flag 1500 to OFF and notifies the information processing controller 200 of the setting.

At timing T511, the information processing controller 200 detects that the hard renderer flag is set to OFF and clears the soft renderer. Here, the setting of the soft rendering of the second page that is being processed is cleared. At this time, the PDL table 2500, the hard renderer flag 1500, and the soft rendering end flag 1510 are in the state illustrated in FIG. 19E. In the above-described flowchart illustrated in FIG. 9, the process proceeds from step S307 to step S312 in such a case where the soft renderer is cleared.

Then, since there is DL data of the next page (second page), the information processing controller 200 transfers the DL data of the second page to the image processing controller 100 at timing T512. At timing T513, the image processing controller 100 receives the DL data of the second page and starts hard rendering. At timing T514, the image processing controller 100 detects end of the hard rendering and issues a hard rendering end command to the information processing controller 200. Here, the task of managing a print job in the image processing controller 100 transfers the rasterized data of the second page generated by the hard rendering to the information processing controller 200. The rasterized data of the second page is transferred after being compressed in JBIG or the like as necessary.

At timing T515, the information processing controller 200 receives the hard rendering end command and the rasterized data of the second page. Since there is no DL data of a next page, the information processing controller 200 deletes all the DL data at timing T516. Also, the information processing controller 200 stores the rasterized data of the second page received at timing T515 in the HDD 2140 or the like.

At timing T517, the information processing controller 200 transfers the rasterized data stored in the HDD 2140 to the image processing controller 100. At timing T518, the image processing controller 100 receives the rasterized data and executes printing of the PDL data on the basis of the received rasterized data. In the rasterized data received by the image processing controller 100 at this time, the rasterized data of the first page has been obtained by soft rendering, whereas the rasterized data of the second page has been obtained by hard rendering. At this time, the PDL table 2500, the hard renderer flag 1500, and the soft rendering end flag 1510 are in the state illustrated in FIG. 19F. In this embodiment, an example of the forming unit is realized by executing the process at timing T518.

As described above, in this embodiment, the image processing controller 100 suspends an operation of the hardware when receiving instructions of an interrupt of an event that should be executed with higher priority than rendering (e.g., copy job) during execution of rendering by the hardware. Then, the information processing controller 200 executes the rendering executed by the hardware by software. Therefore, even if an interrupt to suspend the operation of the hardware occurs during rendering by the hardware, the rendering can be completed as quickly as possible without waiting for restart of the operation of the hardware. Accordingly, degradation of performance to process a PDL job, including execution of rendering of PDL data (DL data), can be prevented.

Also, in this embodiment, if a process that should be preferentially executed ends and the operation of the hardware can be restarted before rendering by software completes, rendering by the hardware is executed. Then, printing is executed by using a result of rendering by the hardware (i.e., a result of rendering by software is abandoned). Therefore, rendering by hardware capable of increasing the speed of rendering can be executed as effectively as possible.

In this embodiment, when an operation of the hardware can be restarted after rendering by the software has been completed, printing is executed by using a result of rendering by the software. Accordingly, the result of rendering by the software can be appropriately used.

In this embodiment, when an operation of the hardware can be restarted after rendering by the software has been partially completed (e.g., to a certain page), printing is executed by using a result of rendering by the software to the completed part (to the middle). As for the residual part, rendering by the hardware is executed thereon, and printing is executed by using a result of rendering by the hardware. Accordingly, both results of rendering by the hardware and software can be appropriately used.

Other Embodiments of the Present Invention

The respective units included in the image forming apparatus and the respective steps in the image forming method according to the above-described embodiment of the present invention can be realized by an operation of a program stored in a RAM or a ROM of a computer. The program and a computer-readable recording medium carrying the program are included in the scope of the present invention.

Also, the present invention can be applied to an embodiment as a system, apparatus, method, program or a storage medium. Specifically, the present invention can be applied to a system including a plurality of apparatuses or to a single apparatus.

According to an embodiment of the present invention, a software program realizing the functions of the above-described embodiment (the program corresponding to the flowcharts illustrated in FIGS. 7 to 9 in the embodiment) may be supplied to a system or apparatus directly or from a remote site. Also, the embodiment of the present invention may be achieved when a computer of the system or apparatus reads and executes the supplied program code.

Therefore, the program code itself installed to the computer to realize the functional processes of the embodiment of the present invention in the computer realizes the present invention. That is, the computer program itself to realize the functional processes of the embodiment of the present invention is included in the scope of the present invention.

In that case, the form of the program is not specified as long as the function of the program is provided. For example, an object code, a program executed by an interpreter, and script data supplied to an OS (Operating System) are acceptable.

Examples of the recording medium to supply the program include a floppy disk, a hard disk, an optical disc, a magneto-optical (MO) disc, a CD-ROM (Compact Disc Read Only Memory), a CD-R (CD Recordable), a CD-RW (CD Rewritable), a magnetic tape, a nonvolatile memory card, a ROM, and a DVD (Digital Versatile Disc (DVD-ROM or DVD-R).

Alternatively, the program can be supplied by accessing a web page on the Internet by using a browser of a client computer and by downloading the computer program of the embodiment of the present invention or a compressed file including an automatic install function from the web page to a recording medium, such as a hard disk.

Alternatively, the program can be supplied by dividing program codes constituting the program of the embodiment of the present invention into a plurality of files and by downloading the respective files from different web pages. That is, a WWW (World Wide Web) server allowing a plurality of users to download program files to realize the functional processes of the embodiment of the present invention in a computer is included in the scope of the present invention.

Also, the program of the embodiment of the present invention may be encrypted, stored in a storage medium such as a CD-ROM, and distributed to users. Furthermore, a user who satisfies a predetermined condition may be allowed to download key information to decrypt the encryption from a web page over the Internet. Furthermore, the encrypted program may be executed with the use of the downloaded key information and may be installed to the computer.

The functions of the above-described embodiment are realized when the computer executes the read program. Also, an OS operating in the computer may execute part or all of actual processes on the basis of instructions of the program, and the functions of the above-described embodiment may be realized by the processes.

Furthermore, the program read from the recording medium may be written in a memory provided in a function expansion board inserted to a computer or a function expansion unit connected to a computer. Then, a CPU or the like provided in the function expansion board or the function expansion unit may execute part or all of actual processes on the basis of instructions of the program. With those processes, the functions of the above-described embodiment may be realized.

The above-described embodiments are only specific examples to carry out the present invention, and the technical scope of the present invention should not be interpreted by the embodiments in a limited manner. That is, the present invention can be carried out in various forms without deviating from a technical thought or a main feature of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-170875 filed Jun. 30, 2008, which is hereby incorporated by reference herein in its entirety.

What is claimed is:

1. An image forming apparatus comprising:
an intermediate language data generating unit configured to generate intermediate language data per predetermined unit using software of an information processing controller;
a hardware rendering unit configured to execute rendering using hardware of the information processing controller based on the intermediate language generated by the intermediate language data generating unit;
a detecting unit configured to detect an interrupt by an event having higher priority than the rendering;
a suspending unit configured to suspend the rendering being executed by the hardware rendering unit if the interrupt is detected while the hardware rendering unit is executing the rendering;

an executing unit configured to execute a process based on the event having higher priority than the rendering when the detecting unit detects the interrupt;

a software rendering unit configured to execute rendering using the software of the information processing controller based on the intermediate language data generated by the intermediate language data generating unit, if the interrupt is detected by the detecting unit while the hardware rendering unit is executing the rendering, a restarting unit configured to cause the hardware rendering unit to restart the suspended rendering upon completion of the process by the executing unit; and a storing unit configured to store information indicating whether or not the intermediate language data per predetermined unit is generated and whether or not rasterized data is generated based on the intermediate language data in an associated manner, wherein the intermediate language data generating unit generates the intermediate language data based on the information stored by the storing unit using the software upon completion of the rendering by the software rendering unit before the hardware rendering unit restarts the suspended rendering, the intermediate language data not being generated based on page description language data, wherein the software rendering unit converts intermediate language data based on which rasterized data has not been generated into rasterized data based on the information stored by the storing unit using the software upon completion of the rendering by the software rendering unit before the hardware restarts the suspended rendering, and wherein the rendering by the software rendering unit and the rendering by the hardware rendering unit are executed in parallel in a case where the rendering corresponding to the suspended rendering has not been completed by the software rendering unit when the process by the executing unit is completed.

2. The image forming apparatus according to claim 1, further comprising:

a forming unit configured to form an image on the basis of a result of rendering performed by whichever of the hardware rendering unit and the software rendering unit completes the rendering the earliest.

3. The image forming apparatus according to claim 1, further comprising:

a deleting unit configured to delete data that has been rendered partially by the hardware rendering unit if the rendering by the software rendering unit is completed earlier than the rendering by the hardware rendering unit.

4. The image forming apparatus according to claim 1, further comprising:

a deleting unit configured to delete data that has been rendered partially by the software rendering unit if the rendering by the hardware rendering unit is completed earlier than the rendering by the software rendering unit.

5. The image forming apparatus according to claim 1, further comprising:

a forming unit configured to form an image on the basis of a result of the rendering by the software rendering unit for part of the rendering, if the part of the rendering by the software rendering unit ends and then the operation of the rendering by the hardware rendering unit restarts, and also to form an image on the basis of a result of the rendering by the hardware rendering unit where rendering by the hardware rendering unit restarts for at least part of a residual part of the rendering.

6. The image forming apparatus according to claim 1, wherein the software rendering unit further executes the rendering if the rendering using the software rendering unit is completed before the rendering by the hardware rendering unit restarts and if there is further data to be rendered.

7. An image forming method comprising:

a generating step of generating intermediate language data per predetermined unit using software of an information processing controller;

a hardware rendering step of executing rendering using hardware of the information processing controller based on the intermediate language generated;

a detecting step of detecting an interrupt by an event having higher priority than the rendering;

a suspending step of suspending the rendering being executed by the hardware rendering step if the interrupt is detected while the hardware rendering step is executing the rendering;

an executing step of executing a process based on the event having higher priority than the rendering when detecting the interrupt;

a software rendering step of executing rendering using the software of the information processing controller based on the intermediate language data generated, if the interrupt is detected by the detecting step while the hardware rendering step is executing the rendering, a restarting step of causing the hardware rendering step to restart the suspended rendering upon completion of the process by the executing step; and storing information indicating whether or not the intermediate language data per predetermined unit is generated and whether or not rasterized data is generated based on the intermediate language data in an associated manner, wherein the intermediate language data generating step generates the intermediate language data based on the information stored using the software upon completion of the rendering by the software rendering step before the hardware rendering step restarts the suspended rendering, the intermediate language data not being generated based on page description language data, wherein the software rendering step converts intermediate language data based on which rasterized data has not been generated into rasterized data based on the information stored using the software upon completion of the rendering by the software rendering step before the hardware restarts the suspended rendering, and wherein the rendering by the software rendering step and the rendering by the hardware rendering step are executed in parallel in a case where the rendering corresponding to the suspended rendering has not been completed by the software rendering step when the process by the executing step is completed.

8. A non-transitory computer readable medium storing an executable program, which on execution by a computer causes the computer to implement the method of claim 7.

* * * * *